United States Patent
Németh et al.

(10) Patent No.: US 10,922,780 B2
(45) Date of Patent: Feb. 16, 2021

(54) METHOD TO DISTRIBUTE THE DRAWING CALCULATION OF ARCHITECTURAL DATA ELEMENTS BETWEEN MULTIPLE THREADS

(71) Applicant: GRAPHISOFT SE, Budapest (HU)

(72) Inventors: Zoltán Németh, Fonyód (HU); Márk Száraz, Diósd (HU); Bertold Gábor Béres, Szigetszentmiklós (HU)

(73) Assignee: GRAPHISOFT SE, Budapest (HU)

( * ) Notice: Subject to any disclaimer, the term of this patent is extended or adjusted under 35 U.S.C. 154(b) by 0 days.

(21) Appl. No.: 16/369,201

(22) Filed: Mar. 29, 2019

(65) Prior Publication Data

US 2019/0311457 A1    Oct. 10, 2019

Related U.S. Application Data

(60) Provisional application No. 62/655,663, filed on Apr. 10, 2018.

(51) Int. Cl.
| | |
|---|---|
| *G06T 19/00* | (2011.01) |
| *G06F 3/0481* | (2013.01) |
| *G06T 1/20* | (2006.01) |
| *G06F 9/48* | (2006.01) |
| *G06T 11/20* | (2006.01) |
| *G06T 13/00* | (2011.01) |

(52) U.S. Cl.
CPC ............ *G06T 1/20* (2013.01); *G06F 3/04815* (2013.01); *G06F 9/48* (2013.01); *G06T 11/20* (2013.01); *G06T 13/00* (2013.01); *G06T 19/003* (2013.01); *G06T 2210/04* (2013.01)

(58) Field of Classification Search
None
See application file for complete search history.

(56) References Cited

U.S. PATENT DOCUMENTS

| 8,060,857 | B2 | 11/2011 | Biggerstaff | |
|---|---|---|---|---|
| 8,106,913 | B1 * | 1/2012 | Diard | G06T 1/20 |
| | | | | 345/502 |
| 8,654,791 | B2 | 2/2014 | Gopinath et al. | |
| 8,918,506 | B1 | 12/2014 | Clubb et al. | |
| 9,350,808 | B2 | 5/2016 | Beck et al. | |
| 9,443,225 | B2 | 9/2016 | Olsen et al. | |
| 2009/0027383 | A1 * | 1/2009 | Bakalash | G06F 9/5044 |
| | | | | 345/419 |
| 2013/0271461 | A1 * | 10/2013 | Baker | G06T 17/00 |
| | | | | 345/420 |

FOREIGN PATENT DOCUMENTS

| AU | 20043083271 B2 | 7/2009 |
|---|---|---|
| CN | 101627365 A | 1/2010 |
| CN | 103650426 B | 10/2016 |
| KR | 101292439 B1 | 8/2013 |
| RU | 2595760 C2 | 8/2016 |

* cited by examiner

*Primary Examiner* — Joni Hsu
(74) *Attorney, Agent, or Firm* — Jackson Walker LLP; Christopher J. Rourk

(57) ABSTRACT

A method for calculating a series of frames of video data, comprising grouping a plurality of architectural data elements into a plurality of threads using a processor. Calculating a frame part of animation data for each of the threads. Determining a calculation time for each of the threads. Modifying the grouping of the plurality of architectural data elements as a function of the calculation time for each of the threads.

19 Claims, 3 Drawing Sheets

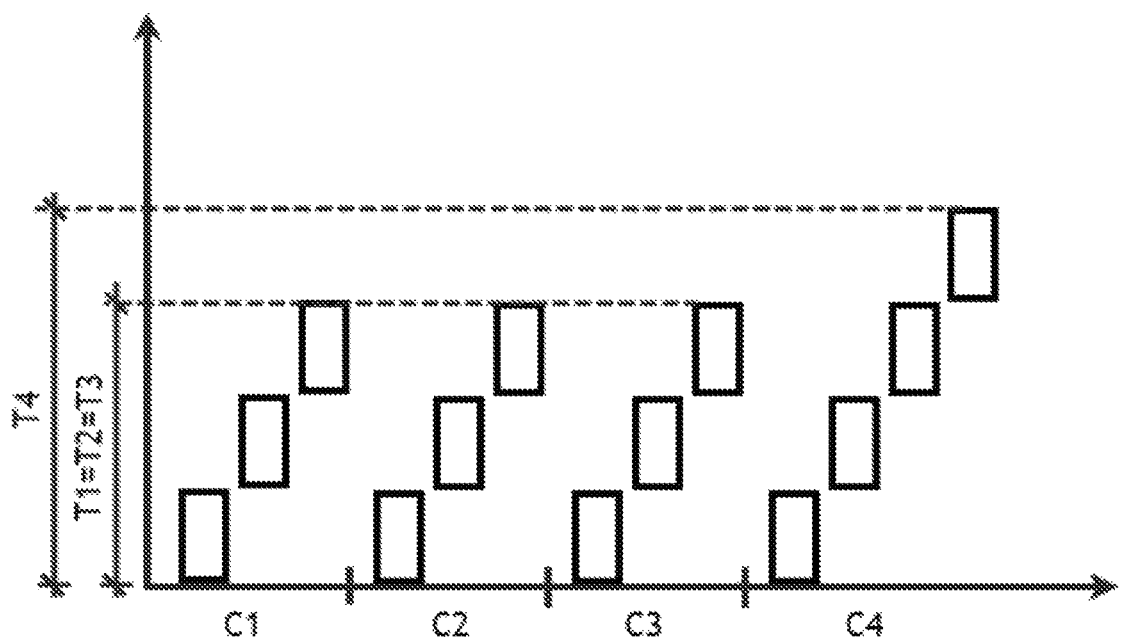
FIGURE 1A       100A
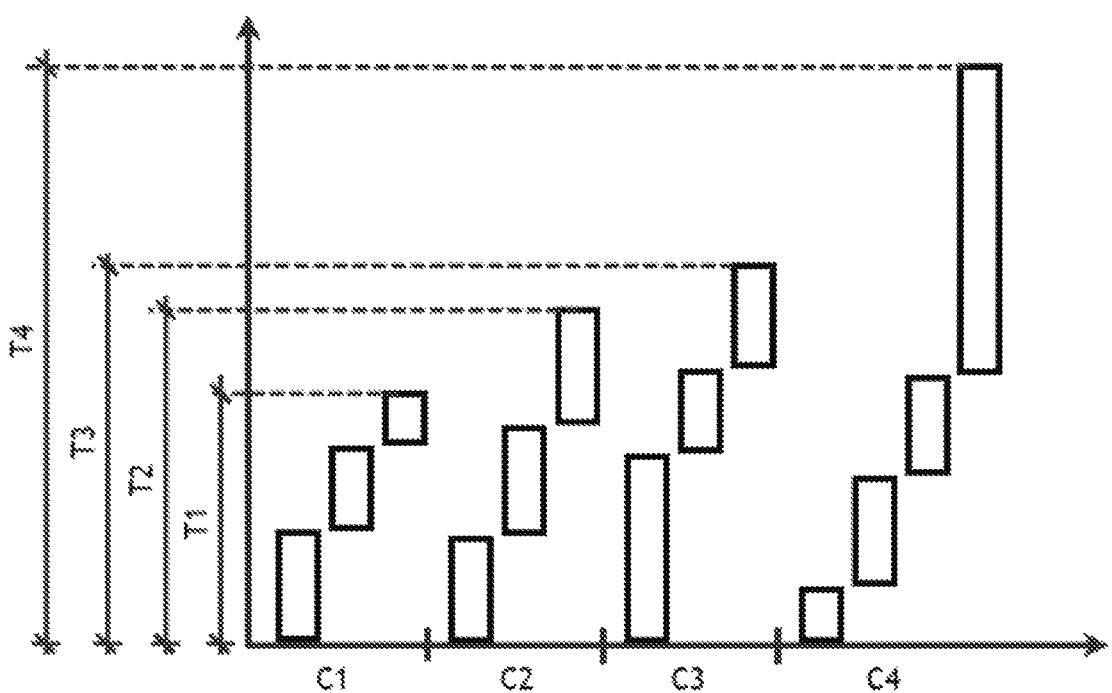
FIGURE 1B       100B

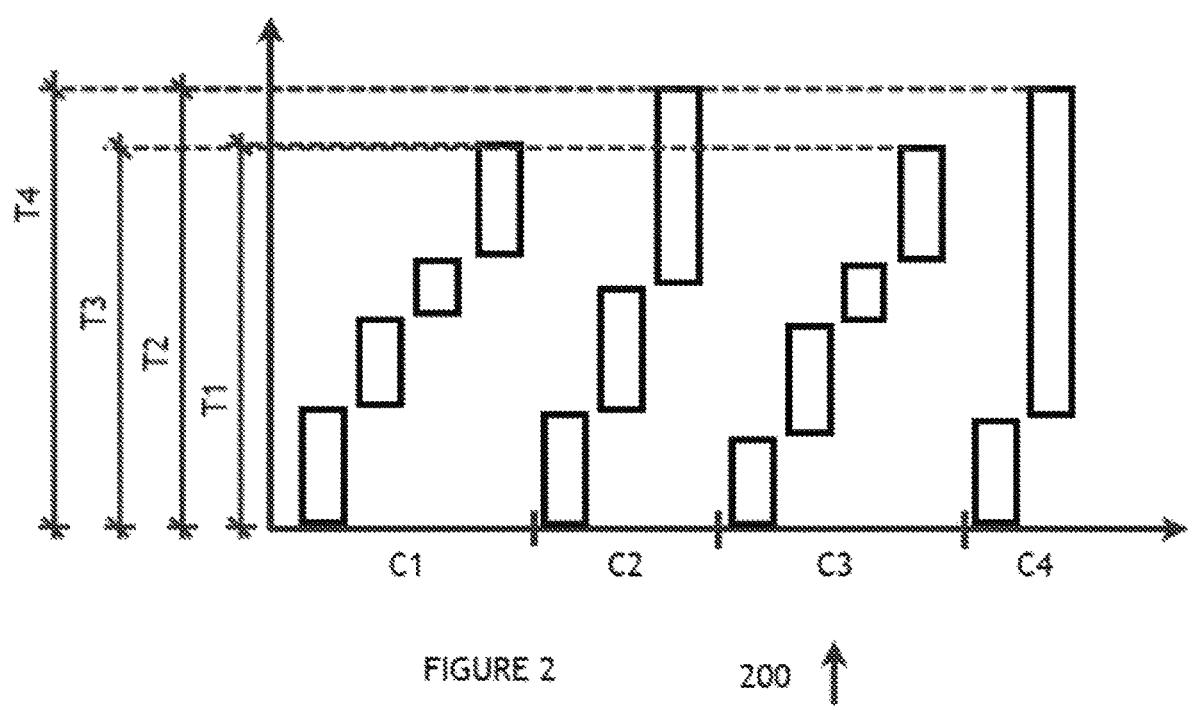
FIGURE 2       200 ↑

METHOD TO DISTRIBUTE THE DRAWING CALCULATION OF ARCHITECTURAL DATA ELEMENTS BETWEEN MULTIPLE THREADS

RELATED APPLICATIONS

The present application claims benefit of and priority to U.S. Provisional Patent Application No. 62/655,663, filed Apr. 10, 2018, which is hereby incorporated by reference for all purposes as if set forth herein in its entirety.

TECHNICAL FIELD

The present disclosure relates generally to systems and methods for architectural calculation, and more specifically to systems and methods to distribute the drawing calculation of architectural data elements between multiple threads.

BACKGROUND OF THE INVENTION

Displaying complex architectural drawings such as large floor-plans, sections with full detail, and other complex visual data on a computer monitor is a computing-heavy task. In architectural design software, such drawings must be redrawn by the computer countless number of times to allow the user to zoom in and out or pan to display the most relevant crop of the drawing (called navigation).

SUMMARY OF THE INVENTION

A method for calculating a series of frames of video data is disclosed that includes grouping a plurality of architectural data elements into a plurality of thread groups using a processor. A frame part (each thread does not calculate an entire frame but part of a frame) of animation data is calculated for each thread (the algorithm uses one thread per core), and a calculation time is determined for each thread. The grouping of the plurality of architectural data elements is modified as a function of the calculation time for each thread.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 1A is a diagram of a first calculation model, in accordance with an example embodiment of the present disclosure;

FIG. 1B is a diagram of an exemplary first calculation, in accordance with an example embodiment of the present disclosure;

FIG. 2 is a diagram of an Nth calculation, in accordance with an example embodiment of the present disclosure;

DETAILED DESCRIPTION OF THE INVENTION

Figure 3:
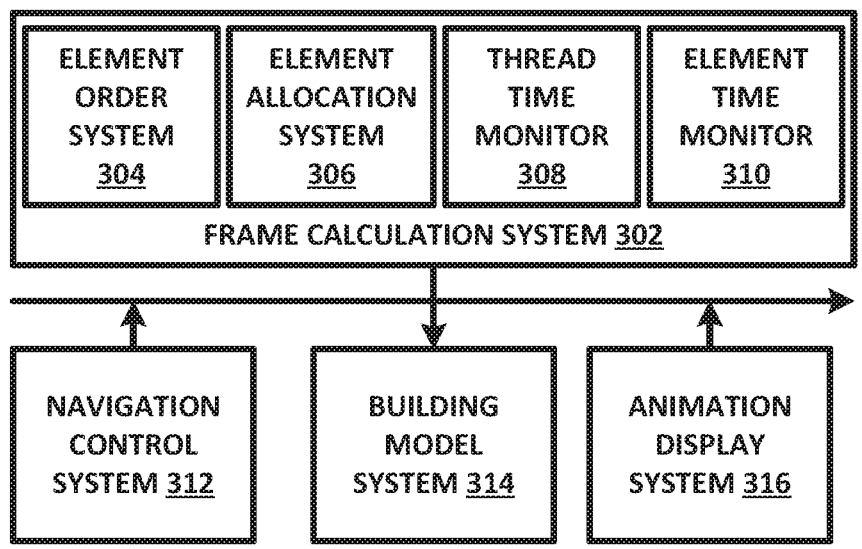
FIG. 3 is a diagram of a system for providing a multi-threaded animation environment, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

As used herein, an architectural data element can refer to one or more elements in a 3D computer-aided model of building elements, or other items as may be understood by a person of ordinary skill in the art. An element drawing can refer to a 2D representation of an individual 3D building element, or other items as may be understood by a person of ordinary skill in the art. Element overlapping can refer to when the drawings of two elements overlap each other, then the element on a higher display order level will hide parts of the other element, or other configurations, as may be understood by a person of ordinary skill in the art. A display order can refer to a linear order of individual elements in a drawing that defines an order in which the elements can be displayed, where elements of a higher order can be displayed on top of an element of a lower order, to achieve the result defined by a user, or other configurations as may be understood by a person of ordinary skill in the art. A drawing can refer to a 2D representation of a 3D building model on computer screen, aggregated from 2D representations of individual elements, using an order defined by the display order, or other configurations as may be understood by a person of ordinary skill in the art. A cropped drawing can refer to a part of a drawing currently displayed on a computer screen, or other items as may be understood by a person of ordinary skill in the art. Navigation can refer to changing from one cropped drawing view to another cropped drawing view, or other actions as may be understood by a person of ordinary skill in the art. Animation can refer to a sequence of frames displayed on the computer screen while going from one cropped drawing view to another cropped drawing view, or other actions as may be understood by a person of ordinary skill in the art. A frame can refer to one still image displaying part of the drawing, or other items as may be understood by a person of ordinary skill in the art. A frame-rate can refer to a number of frames displayed in one second during an animation, or other metrics as may be understood by a person of ordinary skill in the art.

Navigation of a drawing at a user interface is performed using an animation, which transfers the user from one cropped view of a drawing of the computer model to a different cropped view of a drawing of the computer model. The animation consists of an ordered sequence of frames, and one aspect of the quality of the user experience of the animation at the user interface is determined by the number of frames displayed in an interval of time. A higher frame-rate will usually result in a higher quality viewing experience for the user.

A drawing can be a two dimensional representation of a large number of architectural data elements, each of them having its own drawing representation. There can be many different architectural data element types and they can differ from each other in complexity. Furthermore, even identical architectural data element types can differ from each other in complexity depending on their architectural properties, such as fills, geometry, composite layers and hosted doors and windows.

The representations of individual architectural data elements in a drawing can overlap with each other, based on a display order that identifies the order in which elements should be displayed to a user in a user interface from a selected perspective. The navigation can result in the hiding of certain architectural data elements that may have previously been displayed in an earlier frame in the sequence of animation drawings. The display order can be defined by the user in order to get a desired drawing appearance, which can also apply to aesthetics and standards based requirements.

When a frame is calculated on a single thread, then the calculation of the frame is performed on an architectural data element by architectural data element basis, as a function of the display order. In one example embodiment, higher order elements are calculated after lower order elements, where the lowest display order element is the element that has the least prominence in the display. The drawing representation of the newly calculated architectural data elements can then be added on the top of the already calculated drawing representations, which can cause some parts of the already calculated drawing representations to be hidden by the new content. As a result, the calculation of the frame progresses serially, element by element, with some of the work that is done on the lower order elements being rendered unnecessary by the work that is done on the higher order elements.

Introducing multi-threading into the frame calculation process can reduce the time of the calculation, by distributing the calculation of architectural data element drawings between multiple threads, where each thread produces its own drawing frame part, and the frame parts that are calculated by each thread are then merged together to create a single combined drawing frame. In such a multi-threaded process, it is important to distribute the calculation according to the display order, because otherwise the overlapping of the architectural data elements drawings will not be correct. In addition, to generate the final combined drawing frame, all threads must first finish their individual calculation, and their frame part drawings must then be generated on the top of each other, according to the display order.

In a multi-threaded environment, the frame rate is a function of the thread that finishes the calculation of its frame last, because the final compilation frame cannot be completed until the last thread is finished, and the final compilation frame is needed for the subsequent frame calculation in the multi-threaded environment. This constraint means that the waiting threads are not used for calculation while they are waiting, such that their allocated computational resources are wasted during that period due to inactivity. One example of an optimization process from a resource optimization point of view is to distribute the frame calculation tasks between the threaded processes in a way that causes all threads to finish at the same time, or to otherwise optimize the allocation of resources that are used and the ultimate completion time for each frame.

As described earlier, the architectural data elements to be displayed can be of very different complexity, such that it is difficult to divide the calculation between the multiple threads equally without first knowing how long it will take to calculate them one by one. However, once a first frame has been calculated and the completion times for each thread are known, it is possible to re-allocate architectural data elements to different threads, to reduce differences in completion times of the different threads. Because the time required for each architectural data element can change in each successive frame, the re-allocation process is necessarily dynamic, and can be performed continuously for optimal results. The present disclosure provides a self-optimizing method to dynamically distribute the drawing calculation of architectural data elements between multiple threads, so as to reduce differences in the calculation completion time for each thread.

In one example embodiment, the architectural data elements are distributed between the different threads for the first frame as a function of their quantity, without taking their complexity into consideration. Each thread gets a set of architectural data elements as a function of the location of the architectural data elements in relationship to each other in the display order. During the calculation, the system measures and tracks the time to calculate the individual architectural data elements of each frame, in addition to the time to calculate each frame. When the threads finish their individual drawing frame parts, the outputs are then merged into the final composite drawing frame. To accelerate the computer calculation required for redraw, multicore processors can be used for the multithreaded process disclosed herein.

In the 2nd frame and each subsequent frame, the number of architectural data elements to be displayed will most probably change, because the navigation will change the cropped drawing part. These changes can include 1) architectural data elements that have disappeared from the cropped drawing, where those architectural data elements will be removed from the frame calculation, and 2) new architectural data elements that have appeared, and where the calculation time for the new architectural data elements is unknown. The new architectural data elements can be added to the calculation without knowing exactly how long it will take to calculate them, in a manner similar to the process used for the first frame.

Each of the threads is then used to calculate a new frame part, and the calculation times required for the individual architectural data elements are monitored. Once all the threads have completed their calculation, the frame can be generated and displayed, and the next frame calculation can be started. In this manner, the process dynamically adjusts the allocation of architectural data elements to each thread after every frame, to optimize the distribution of architectural data elements to different threads as a function of the completion time for the calculation of each architectural data element in the previous frame.

In an alternative embodiment, the calculation time for each architectural data element can be estimated for the first frame and the allocation of architectural data elements can be based on the estimated calculation time. In another alternative embodiment, the calculation time for each architectural data element can be estimated for each frame, and the allocation of architectural data elements can be based on the estimated calculation time.

FIG. 1A is a diagram 100A of a first calculation estimate allocation model, in accordance with an example embodiment of the present disclosure. The horizontal axis of diagram 100A shows a number of architectural data elements, and the vertical axis shows an expected time to calculate an element. The elements are grouped into arbitrary threads C1 through C4, each having an equal number of elements, with the same estimated completion time for each thread T1 through T4. Based on the actual completion times, the architectural data elements will be re-allocated to different threads, to minimize the difference between the completion times for each thread.

FIG. 1B is a diagram 100B of an exemplary first calculation, in accordance with an example embodiment of the present disclosure. The horizontal axis of diagram 100B shows the number of architectural data elements, and the vertical axis shows an exemplary first calculation time for each thread. The elements are grouped into arbitrary threads C1 through C4, each having the same number of elements, with different completion times for each thread T1 through T4.

FIG. 2 is a diagram 200 of a second or subsequent calculation, in accordance with an example embodiment of the present disclosure. In this example embodiment, the number of architectural data elements for each of the threads C1 through C4 is different, as is the associated calculation time for each architectural data element, but the actual completion time T1 through T4 for each corresponding thread C1 through C4 is approximately equal.

FIG. 3 is a diagram of a system 300 for providing a multi-threaded animation environment, in accordance with an example embodiment of the present disclosure. System 300 includes frame calculation system 302, element order system 304, element allocation system 306, thread time monitor 308, element time monitor 310, navigation control system 312, building model system 314 and animation display system 316, each of which can be implemented in hardware or a suitable combination of hardware and software.

Frame calculation system 302 receives element data sets that define a plurality of architectural data elements from a three dimensional computer model and a viewing position and generates frames of video data by calculating a drawing frame, using the spatial relationships between the architectural data elements and the viewing position, data that defines the appearance of the architectural data elements and other suitable data. In one example embodiment, frame calculation system 302 can include a plurality of different computing threads, where each thread is used to calculate different sets of elements, and where the output from each thread is combined into a single frame, such that the frame is generated after each thread has completed its calculation.

Element order system 304 determines an element order based on the architectural data elements that will be contained in a frame, the relationship between the architectural data elements, a viewing position, viewing order preference data and other associated or suitable data. In one example embodiment, element order system 304 can assign an element order to architectural data elements for a drawing frame, such as by assigning the lowest order to an architectural data element that should have the least prominence in a frame and the highest order to an architectural data element that should have the greatest prominence in a frame. An architectural data element that is closer to the point of view can have a higher order than an architectural data element that is farther away, and additional display order modifications can be applied as a function of the importance of an architectural data element (such as where structural elements can have a greater importance than detail elements), a number of intervening elements (such as where an element that is behind a large number of intervening elements has a lower importance) and other suitable modifications.

Element allocation system 306 receives architectural data element data and display order data and assigns architectural data elements to computing threads for frame calculations. In one example embodiment, element allocation system 306 can assign architectural data elements to threads based on the display order ranking of the architectural data elements, the location of the architectural data elements within a computer model or other suitable data, and can also or alternatively receive current allocation data for a previous frame and can modify the current allocation data to change the allocation as a function of a change in point of view, a change in location, or other suitable variables.

Thread time monitor 308 monitors the calculation time required for each thread and identifies threads that require greater time than other threads and threads that require less time than other threads to complete calculation. Threads that take longer can be flagged for a reduction in the number of assigned architectural data elements, and threads that take less time can be flagged to receive additional architectural data elements, or other suitable time monitoring data can also or alternatively be used.

Element time monitor 310 monitors a calculation time required for each architectural data element or a plurality of architectural data elements, to allow architectural data elements to be reassigned between threads to improve uniformity of the time for each thread to complete calculation. In one example embodiment, the calculation time for each architectural data element can be used to select architectural data elements that will be assigned from threads that take longer to threads that require less time to complete calculation, or other suitable reallocation processes can also or alternatively be used.

Navigation control system 312 generates one or more user interface controls and receives user input to change the navigation through a two-dimensional representation of a three dimensional computer model, such as a model of a building, a landscape, a structure and so forth. In one example embodiment, navigation control system 312 can be used to generate a point of view for an animation, a series of frames for an animation or other suitable animation controls. Navigation control system 312 can receive a sequence of user-entered navigation controls, start and stop points for navigation or other suitable data, and can generate point of view modification data and other suitable data.

Building model system 314 includes a plurality of architectural data elements having a predetermined relationship between each other and predetermined characteristics, such as to design a building or structure for construction, to model an existing building, structure or landscape, or for other suitable purposes. In one example embodiment, building model system 314 can include hidden design elements that would not be seen during an animation of the building or other structure, such as floor and wall structural elements, wiring elements, drainage and water pipe elements and so forth, as well as design elements that would not be hidden but which may be of lesser prominence, such as wall finish elements, ornamental feature elements and so forth.

Animation display system 316 receives a series of frames of animation data and generates a display for viewing by a user. In one example embodiment, animation display system 316 can include a video display, a head-mounted display for augmented reality or virtual reality viewing or other suitable devices, and associated drivers, display algorithms and other suitable algorithms that operate on a processor or other suitable devices.

System 300 provides technical advantages over other systems by creating threads of architectural data elements and adjusting the allocation of architectural data elements to threads as a function of calculation completion time, movement or other animation factors that can cause the calculation time for a frame to change. In this manner, system 300 provides substantially more than the prior art by allowing a multithreaded processing regime to be applied to the calculation of an animation sequence of frames of video data for the generation of a user interface.

Figure 4:
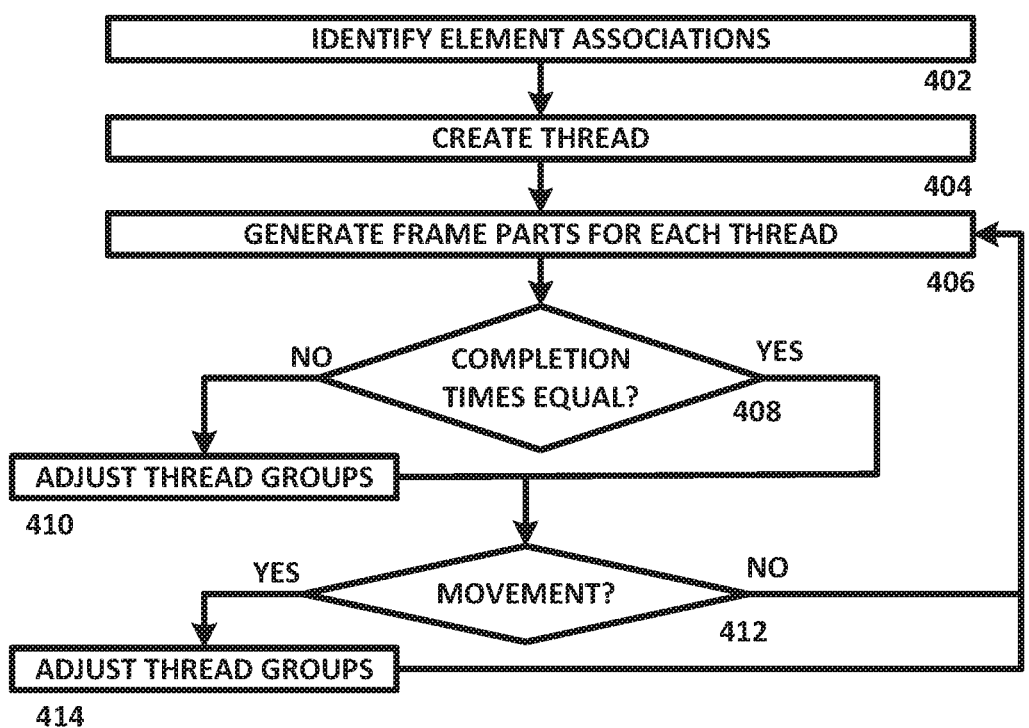
FIG. 4 is a flow chart of an algorithm for providing a multi-threaded animation environment, in accordance with an example embodiment of the present disclosure.

FIG. 4 is a flow chart of algorithm 400 for providing a multi-threaded animation environment, in accordance with an example embodiment of the present disclosure. Algorithm 400 can be implemented in hardware or a suitable combination of hardware and software and can operate in conjunction with one or more processors or in other suitable manners.

Algorithm 400 begins at 402, where architectural data element associations are identified. In one example embodiment, each architectural data element can be defined by predetermined variables that identify what the architectural data element is, how it responds to different inputs, how it interfaces with other architectural data elements and so forth, to allow a complete model of a building, structure, landscape or other suitable models to be made. The models are constructed of data associations and form a special-purpose database of data that defines each architectural data element and their relationships to other architectural data elements. In this example embodiment, the architectural data element associations can be used to identify one or more architectural data elements in a predetermined region of a frame of video data that is to be calculated, architectural data elements having related predetermined display order values that can be used to identify which architectural data elements will have the greatest prominence in the frame of video data, previously determined groups of architectural data elements, architectural data elements that have a calculation time meeting predetermined criteria or other suitable architectural data elements. The algorithm then proceeds to 404.

At 404, threads of architectural data elements are created. In one example embodiment, architectural data elements for each thread can be selected based on a display order, such as by selecting the same number of architectural data elements for each thread group based on a display order ranking, which may be performed for calculation of a first frame in a sequence of frames of video data, or in other suitable manners. For example, architectural data elements for each thread can be selected starting from a previous thread of architectural data elements and then adding or removing architectural data elements, such as based on a calculation time for each architectural data element, a display order ranking or other suitable data. The algorithm then proceeds to 406.

At 406, a frame part is generated for each thread, and each frame part is combined into a single animation frame for the animation frame sequence. In one example embodiment, a thread can calculate graphical display values for each element, such as to generate one or more pixel display brightness values, color values or other suitable data that can be used to generate a frame of video display data. The graphical display values can be calculated for each architectural data element in a predetermined order of architectural data elements, such as a display order, based on associations between architectural data elements or in other suitable manners. The algorithm then proceeds to 408.

At 408, a completion time for each thread is analyzed. If it is determined that the completion times are not equal, the algorithm proceeds to 410, otherwise the algorithm proceeds to 412. The algorithm can reassign elements until all of the threads finish at the same time, as the algorithm is configured to unify calculation times.

At 410, one or more architectural data elements are re-assigned to different threads. In one example embodiment, a completion time and display order rank for each architectural data element can be identified, and architectural data elements can be identified for re-allocation to a different thread. Likewise, the architectural data elements having a display order rank that is closest to the display order rank of the architectural data elements in the target thread group can also be selected, and additional selection criteria can also or alternatively be applied to increase or decrease the number of architectural data elements that are to be transferred, such as to optimize the time each processor core takes to calculate elements or for other suitable purposes. After the thread adjustments are completed, the algorithm proceeds to 412.

At 412, it is determined whether movement has occurred. In one example embodiment, display order can be based on a number of factors that include a number of elements in a frame, a size of elements in a frame, a spacing between elements in a frame, a distance between a point of view and each element in a frame and other suitable data. If it is determined that movement has occurred, the algorithm proceeds to 414, otherwise the algorithm proceeds to 406.

At 414, one or more threads are adjusted to accommodate new architectural data elements that need to be displayed, to remove old architectural data elements that do not need to be displayed and other changes resulting from the animation movement. In one example embodiment, threads for frames that have fewer remaining architectural data elements after movement can receive additional architectural data elements from threads that receive additional architectural data elements after movement. In another alternative embodiment, completion times for each thread can be estimated, architectural data elements can be re-assigned based on new display order data or other suitable modifications resulting from animation movement can be accommodated. The algorithm then returns to 406.

In operation, algorithm 400 allows an animation sequence of frames to be generated in a multi-threaded computing environment, to facilitate a reduction in computing time relative to single threaded frame computation. Algorithm 400 provides technical advantages over other processes by creating threads of architectural data elements and adjusting the allocation of architectural data elements to threads as a function of calculation completion time, movement or other animation factors that can cause the calculation time for a frame to change. In this manner, algorithm 400 provides substantially more than the prior art by allowing a multi-threaded processing regime to be applied to the calculation of an animation sequence of frames of video data for the generation of a user interface.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure, such as to generate frames of data for suitable animation sequences, including but not limited to character animation, scene animation, and so forth. All such modifications and variations are intended to be included herein within the scope of this disclosure and protected by the following claims.

What is claimed is:

1. A method for calculating a series of frames of video data, comprising:
    grouping a plurality of architectural data elements into a plurality of threads using one or more algorithms that are operating on a processor;
    calculating a frame part of animation data for each of the threads using the one or more algorithms that are operating on the processor;
    determining a calculation time for each of the threads using the one or more algorithms that are operating on the processor;
    modifying the grouping of the plurality of architectural data elements as a function of the calculation time for each of the threads to achieve the same calculation time using the one or more algorithms that are operating on the processor;
    monitoring a calculation time required for each architectural element; and
    identifying one or more architectural elements that require a greater calculation time than a calculation time of one or more other architectural elements.

2. The method of claim 1 wherein grouping the plurality of architectural data elements into the plurality of threads using the processor comprises grouping the plurality of architectural data elements into the plurality of threads as a function of a display order for each of the architectural data elements.

3. The method of claim 1 wherein grouping the plurality of architectural data elements into the plurality of threads using the processor comprises grouping the plurality of architectural data elements into the plurality of threads as a function of a calculation time for each of the architectural data elements.

4. The method of claim 1 wherein determining the calculation time for each of the threads comprises determining the calculation time for a plurality of threads.

5. The method of claim 4 wherein modifying the grouping of the plurality of architectural data elements as the function of the calculation time for each of the threads comprises assigning one or more architectural data elements from a first thread having an associated calculation time that is greater than the associated calculation time of a second thread.

6. The method of claim 1 wherein modifying the grouping of the plurality of architectural data elements as the function of the calculation time for each of the threads comprises assigning one or more architectural data elements from a first thread to a second thread.

7. The method of claim 1 wherein modifying the grouping of the plurality of architectural data elements as the function of the calculation time for each of the threads comprises assigning one or more new architectural data elements to a first thread.

8. The method of claim 1 further comprising modifying the grouping of the plurality of architectural data elements as a function of a change in position of an animation sequence.

9. The method of claim 1 further comprising modifying the grouping of the plurality of architectural data elements as a function of a change in a point of view of an animation sequence.

10. The method of claim 1 wherein modifying the grouping of the plurality of architectural data elements as the function of the calculation time for each of the threads to achieve the same calculation time using the one or more algorithms that are operating on the processor is performed for a second frame of animation data.

11. The method of claim 1 wherein modifying the grouping of the plurality of architectural data elements as the function of the calculation time for each of the threads to achieve the same calculation time using the one or more algorithms that are operating on the processor is performed for a series of frames of animation data, where changes are made in each successive frame of the series of frames.

12. The method of claim 1 wherein modifying the grouping of the plurality of architectural data elements as the function of the calculation time for each of the threads to achieve the same calculation time using the one or more algorithms that are operating on the processor is performed for a series of frames of animation data, where changes are made in each successive frame of the series of frames to reduce a difference in calculation time between each of threads.

13. The method of claim 1 further comprising:
determining a difference in a calculation time for each thread and each other thread; and
allocating one or more of the architectural data elements to a different thread to reduce the difference in the calculation time for at least one thread and one second thread.

14. A system for calculating a series of frames of video data, comprising:
a building model system storing a plurality of architectural data elements;
a frame calculation system operating on a processor and configured to retrieve the plurality of architectural data elements from the building model system and to calculate a frame of video data, wherein the frame calculation system further comprises an element allocation system configured to assign each of the plurality of architectural data elements to one of a plurality processing threads; and
an element time monitor operating on the processor and configured to monitor a calculation time required for each architectural element and to identify one or more architectural elements that require a greater calculation time than a calculation time of one or more other architectural elements.

15. The system of claim 14 wherein the frame calculation system further comprises an element order system configured to determine an order of the architectural data elements prior to the assignment of the plurality of architectural data elements to one of the plurality processing threads.

16. The system of claim 15 wherein the element allocation system is configured to assign the plurality of architectural data elements to one of the plurality processing threads as a function of the order of the architectural data elements.

17. The system of claim 14 wherein the frame calculation system further comprises an element order system configured to determine a display order of the architectural data elements prior to the assignment of the plurality of architectural data elements to one of the plurality processing threads, and wherein the element allocation system is configured to assign the plurality of architectural data elements to one of the plurality processing threads as a function of the display order.

18. The system of claim 14 further comprising a thread time monitor operating on the processor and configured to monitor a calculation time required for each thread and to identify one or more threads that require a greater calculation time than a calculation time of one or more other threads.

19. The system of claim 14 further comprising a thread time monitor operating on the processor and configured to monitor a calculation time required for each thread and to identify one or more threads that require a lesser calculation time than a calculation time of one or more other threads.

* * * * *